United States Patent [19]
Liefde et al.

[11] Patent Number: 4,963,757
[45] Date of Patent: Oct. 16, 1990

[54] APPARATUS FOR SENSING A CHARACTERISTIC OF A TRAVELING YARN

[75] Inventors: Yvan V. Liefde, Zottegem; Marcel de Vuyst, Waregem, both of Belgium; Peter Goetsches, Monchengladbach, Fed. Rep. of Germany

[73] Assignee: W. Schlafhorst & Co., Fed. Rep. of Germany

[21] Appl. No.: 289,208

[22] Filed: Dec. 22, 1988

[30] Foreign Application Priority Data

Dec. 24, 1987 [EP] European Pat. Off. ............ 87119212

[51] Int. Cl.⁵ ............................................. G01N 21/86
[52] U.S. Cl. .................................... 250/571; 356/429
[58] Field of Search ............. 250/560, 561, 216, 571, 250/572; 356/429, 430, 431

[56] References Cited

U.S. PATENT DOCUMENTS

| 2,438,365 | 3/1948 | Hepp et al. | 250/561 |
| 3,401,267 | 9/1968 | Engle et al. | 250/219 |
| 3,582,661 | 6/1971 | Emmasingel | 250/219 |
| 3,712,743 | 1/1973 | Harris et al. | 250/219 |
| 3,840,869 | 10/1974 | Pugh | 340/259 |
| 4,021,119 | 5/1977 | Stauffer | 250/561 |

FOREIGN PATENT DOCUMENTS

| 1048050 | 7/1957 | Fed. Rep. of Germany . |
| 1281486 | 12/1962 | France . |
| 1463560 | 12/1966 | France . |
| 8401622 | 4/1984 | PCT Int'l Appl. . |
| 994917 | 6/1965 | United Kingdom . |

Primary Examiner—David C. Nelms
Attorney, Agent, or Firm—Shefte, Pinckney & Sawyer

[57] ABSTRACT

An apparatus for sensing characteristics of a traveling yarn in response to the shadow cast by the yarn includes a light emitting element and a pair of light sensing elements in opposed relation to the light emitting element. The yarn travels through a slot between the light emitting element and the pair of light sensing elements and is guided such that only a selected one of the light sensing elements is shadowed. An aperture assembly can be positioned between the light emitting element and the slot to channel the emitted light. The aperture assembly includes a plurality of apertures increasing in area in the direction away from the light emitting element and being framed by surfaces inclined away from the light emitting element and decreasingly inclined from frame to frame in the direction away from the light emitting element.

26 Claims, 3 Drawing Sheets

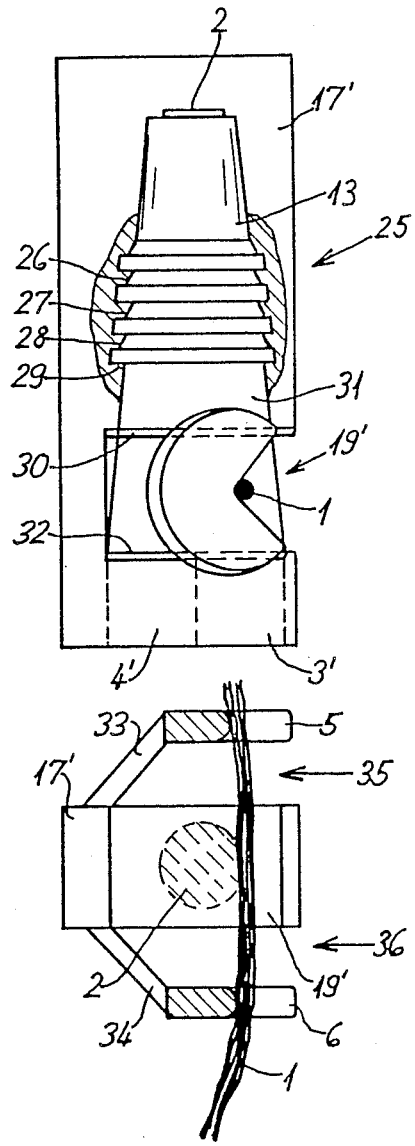
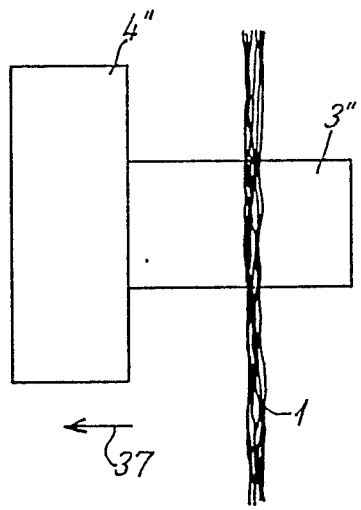
FIG. 3
FIG. 5
FIG. 4

APPARATUS FOR SENSING A CHARACTERISTIC OF A TRAVELING YARN

BACKGROUND OF THE INVENTION

The present invention relates to an apparatus for sensing a characteristic of a traveling yarn, and more particularly to such an apparatus acting in response to the shadow cast by the yarn or its reflection on a light sensing element as the yarn travels through a slot of an apparatus supporting the light sensing element and a light emitting source.

Apparatus for sensing characteristics of traveling yarn are known and one type of apparatus includes a light emitting source spaced from a light sensing element and adapted to monitor changes in the light sensed by the light sensing element as a yarn travels within the space between the light sensing element and the light emitting source. However, problems arise in the operation of these types of yarn sensing apparatus due to, among other reasons, the accumulation of dust, dirt or the like on the light emitting or light sensing elements and the presence of light emitted from sources other than the light emitting source. Both these operational problems distort the accuracy of the sensing based upon the light sensed by the light sensing member.

SUMMARY OF THE INVENTION

The present invention provides an apparatus for more effectively sensing a yarn and for minimizing the distorting influences of dirt, dust or penetrating outside light.

In the use of the apparatus provided by the present invention, if dirt or dust, such as that transported to the vicinity of the apparatus by the traveling yarn, accumulates on the light emitting source or the light sensing element, the two light sensing components of the light sensing element are equally affected by this accumulation so that the predetermined relationship between the sensed values derived from the one light sensing component with respect to the other light sensing component are only minimally or not at all influenced. In the event that outside light falls upon the light sensing element, both of its components are substantially equally affected by this occurrence and, accordingly, the relationship between the values sensed from each component thereby will not be distorted. Additionally, if an alteration in the temperature during the operation of the apparatus is anticipated which may influence the sensing process, this variable factor will affect the two light sensing components in substantially equal fashion so that the relationship between the sensed values derived from each component will not be distorted.

Briefly described, the present invention provides an apparatus for sensing a characteristic of a traveling yarn including a light emitting element, a pair of light sensing elements for producing signals in response to sensed light, the pair of light sensing elements being in opposed relation to the light emitting element such that a slot is defined therebetween and the light emitting element providing a continuous luminous field within the slot extending across the combined extent of the light sensing elements, and means for guiding yarn through the continuous luminous field relative to the pair of light sensing elements such that the yarn casts a shadow only on a selected one of the pair of light sensing elements. Preferably, the light sensing elements are photo electric cells and the signals produced by these elements are electrical signals corresponding to a predetermined characteristic of the yarn. The electrical signals produced by the light sensing elements can correspond to the cross-sectional diameter of the yarn, the volume of yarn per unit length or the mass of the yarn per unit length.

In one preferred embodiment, the apparatus further includes an aperture assembly positioned between the light emitting element and the slot, the aperture assembly including a plurality of apertures increasing in area in the direction away from the light emitting element.

According to another aspect of the present invention, an apparatus is provided for sensing a characteristic of a traveling yarn, the apparatus including a housing having a slot, a light emitting element positioned on one side of the slot, light sensing means positioned in opposed relation to the light emitting element on another side of the slot, the light sensing means producing signals in response to sensed light and the light emitting element providing a continuous luminous field within the slot extending across the light sensing means, means for guiding yarn through the continuous luminous field relative to the light sensing means such that the yarn casts a shadow on the light sensing means and an aperture assembly positioned between the light emitting element and the slot, the aperture assembly including a plurality of apertures increasing in area in the direction away from the light emitting element. Preferably, each of the apertures is formed in a frame with the frames defining the channel formed by the apertures. Preferably, each frame has an edge surface facing the aperture therein and being inclined with respect to the light from the light emitting element so as not to be directly contacted by the light. In one preferred embodiment, the inclination of the edge surfaces of the frames decreases from frame to frame in the direction away from the light emitting element.

BRIEF DESCRIPTION OF THE DRAWINGS

FIG. 3 is a partial top plan view, partially in section, of another preferred embodiment of the apparatus of the present invention;

FIG. 4 is a side vertical sectional view of a yarn guide means of a preferred embodiment of the apparatus of the present invention;

FIG. 5 is a side elevational view of a light sensing element of a further preferred embodiment of the apparatus of the present invention;

DETAILED DESCRIPTION OF THE PREFERRED EMBODIMENTS

Figure 1:
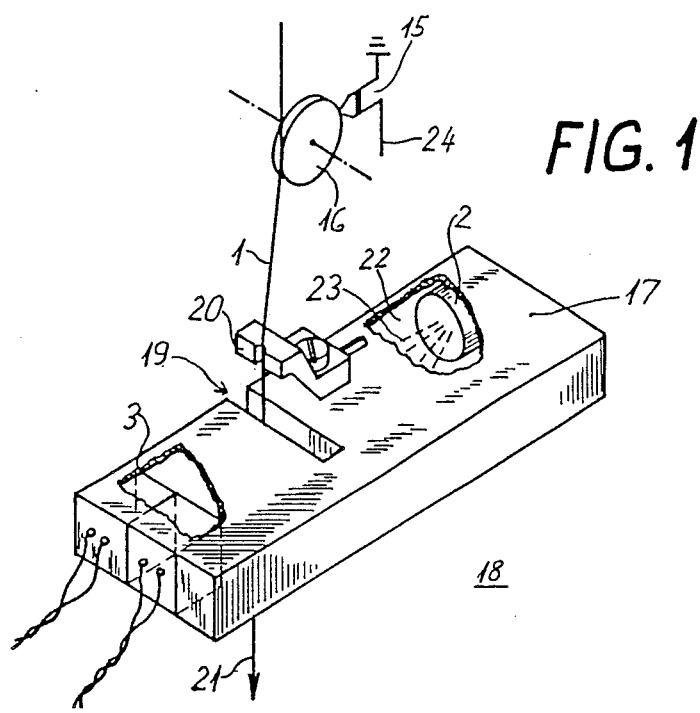
FIG. 1 is a perspective view of one preferred embodiment of the apparatus of the present invention.

In FIG. 1, one preferred embodiment of the apparatus of the present invention is illustrated in the form of an optical electric apparatus 18 for sensing a characteristic of a yarn 1. The apparatus includes a housing 17 defining a sensing slot 19 through which the yarn is guided to be sensed by the apparatus 18. A yarn guide means 20 guides the yarn in the direction indicated by the arrow 21 through the slot 19 as the yarn travels from a roller 16 about which it is trained.

The housing 17 includes a chamber 22 in which a light emitting element 2 is secured. The light emitting element 2 emits a beam of light 23 in a direction transverse to the sensing slot 19. A first light sensing element 3 and a second light sensing element 4 are secured within the housing 17 in opposition to the light emitting element 2 across the slot 19 such that the beam of light 23 passing transversely through the slot 19 is sensed by the first light sensing element 3 and the second light sensing element 4. The first light sensing element 3 and the second light sensing element 4 can include photo resistors or photo electric cells. The yarn guiding means 20 guides the traveling yarn 1 such that the yarn casts a shadow on the first light sensing element 3 but does not cast a shadow on the second light sensing element 4.

Figure 2:
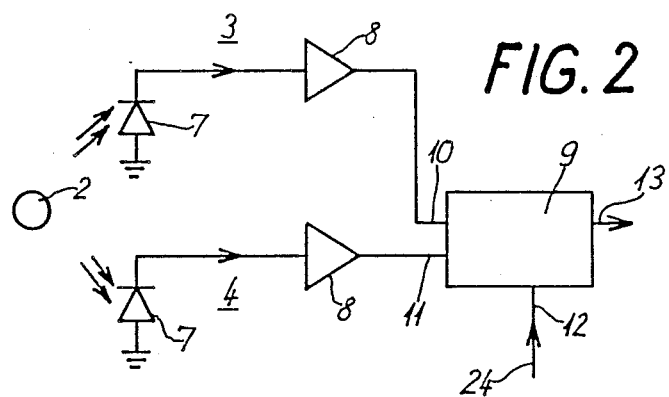
FIG. 2 is a schematic representation of the apparatus shown in FIG. 1.

As seen in FIG. 2, the light sensing elements 3, 4 are connected to a data processing apparatus 9 whereby signals from the light sensing elements 3, 4 are received by the data processing apparatus 9 and interpreted as indications of the cross-sectional diameter of the yarn, the volume of the yarn per unit length and the mass of the yarn per unit length. Specifically, the first light sensing element 3 includes a photodiode 7 connected to an amplifier 8 which is connected by a lead 10 to the data processing apparatus 9. The second light sensing element 4 includes a photodiode 7 connected to an amplifier 8 which is connected by a lead 11 to the data processing apparatus 9. A jack 12 in the data processing apparatus 9 secures a lead 24 connecting the data processing apparatus with an inductive impulse receiver 15. The inductive impulse receiver 15 includes a magnetic arm which senses the rotation of the roller 16 and supplies the data processing apparatus 9 with a cyclical frequency produced in response to the speed of the yarn 1 through the slot 19. Preferably, the inductive impulse receiver 19 supplies the data processing apparatus 9 with one impulse for each one millimeter lineal movement of the yarn 1. The data processing apparatus 9 has an output 13 through which digital signals are outputed and these digital signals correspond to the results of comparison of the respective light sensing signals supplied by the first light sensing element 3 and the second light sensing element 4. The data processing apparatus 9 continually outputs these digital signals such that a digital representation of the diameter of the yarn 1 is produced at each one millimeter interval of the yarn length.

In FIG. 3, another embodiment of the apparatus of the present invention is illustrated and includes a housing 17' having a sealed chamber 13. The sealed chamber 13 includes a light emitting element 2 and an aperture assembly 25 which is composed of a plurality of spaced, parallel apertures 26–29. The housing 17' includes a slot 19' and a glass plate 30 secured to one side of the slot which plate 30 seals the chamber 13 with respect to the slot 19. The extent of the apertures 26–29 increases as measured transverse to the longitudinal extent of the aperture assembly 25 extending from the slot 19'. Alternatively, in lieu of the apertures 26–29 or additionally in the region of the glass plate 30 or a region 31 of the sealed chamber 13, an optical element can be positioned such as, for example, a converging or convex lens, for directing light passing therethrough in a parallel direction.

The embodiment of the apparatus of the present invention illustrated in FIG. 3 additionally includes a first light sensing element 3' and a second light sensing element 4' secured within the housing 17' in side by side relationship to one another. A glass plate 32 defining one side of the slot 19' covers the light sensing elements 3', 4' and cooperates with the portion of the housing 17' surrounding the light sensing elements 3', 4' such that these elements are sealed within a dust-free chamber similar to the sealed chamber 13. Preferably, the surfaces of the light sensing elements 3', 4' facing in the direction of the slot 19' are parallel to one another although this is not necessary. For example, in some circumstances, these surfaces may be better adapted to the respective light separating curvature if they are arranged at an angle less than 180° to one another.

As shown in FIG. 4, the apparatus of the present invention illustrated in FIG. 3 additionally includes a pair of yarn guiding elements 5, 6. The yarn guide element 5 is supported by a bracket 33 above one surface of the housing 17' and the yarn guide element 6 is supported by a bracket 34 at a spacing from an opposite surface of the housing 17'. The yarn guide elements 5, 6 are in alignment with the measuring slot 19'. The yarn guide element 5 and the surface of the housing 17' from which it is spaced define a spacing 35 therebetween having an extent in the range of about 4 to 8 millimeters. The yarn guide element 6 and the surface of the housing 17' from which it is spaced define a spacing 36 therebetween having an extent in the range of about 4 to 8 millimeters. The spacings 35, 36 permit the passage therethrough of a cleaning fluid such as cleaning air, which can, for example, be generated by the movement of the yarn 1 through the slot 19' which movement, at higher speeds, can produce a corresponding movement of the air having sufficient swirling and suction to provide some cleaning effect in the vicinity of the slot 19'. Alternatively, the cleaning air can be supplied from the air surrounding the housing 17' or from some other source.

Figure 9:
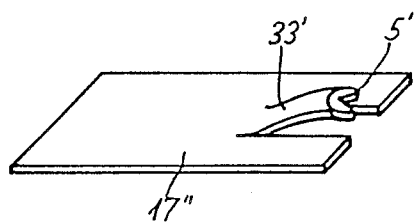
FIG. 9 is a yarn guide means of one preferred embodiment of the apparatus of the present invention.

In the embodiment of the apparatus of the present invention, illustrated in FIG. 9, the yarn guide means are supported by brackets integrally formed with the opposite faces of the housing of the apparatus by stamping. Alternatively, the brackets can be formed by injection molding.

In FIG. 5, a further embodiment of the apparatus of the present invention is illustrated and includes a first light sensing element 3" and a second light sensing element 4" arranged perpendicularly to one another such that the longitudinal extent of the second light sensing element 4" is perpendicular to the longitudinal extent of the first light sensing element 3". The light sensing elements 3", 4" are secured within the housing 17' in a disposition such that the yarn 1 is moved through the slot 19' in a direction of movement parallel to the width extent of the first light sensing element 3". Preferably, the first light sensing element 3" is the light sensing element closest to the back side of the slot 19', that is, the side interconnecting, for example, the glass plates 30 and 32. In this disposition, any lateral movement of the yarn 1 in the direction indicated by the arrow 37 will produce a yarn signal of short duration which is suitable for control and monitoring purposes. For example, in an automatic winding operation, the occurrence of this signal can indicate the positioning of the yarn 1 in the slot 19' or the beginning of the yarn piecing operation. Additionally, a predetermined control program can be activated in response to the generation of the yarn signal.

In the embodiment of FIG. 5, one light sensing element has its longitudinal extent perpendicular to the longitudinal extent of the other light sensing element contiguous thereto. In this embodiment, more precise values can be obtained if the yarn is positioned to cast a shadow on the light sensing element whose longitudinal extent is perpendicular to the direction of travel of the yarn. This embodiment reduces the depth of the slot relative to other embodiments of the apparatus such as, for example, an embodiment in which the longitudinal extents of the two light sensing elements were both perpendicular to the direction of travel of the yarn. A slot of reduced depth has advantages such as, for example, minimization of the detrimental effects of dust and dirt accumulation.

Figure 6:
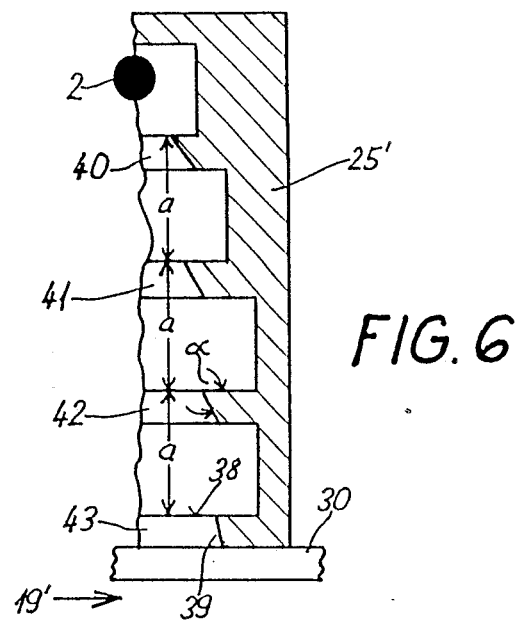
FIG. 6 is a partial top plan view, partially in section, of one embodiment of an aperture assembly according to the present invention.

In FIG. 6, an aperture assembly 25' adapted to be installed in the housing 17' of the apparatus of the present invention is illustrated and includes a plurality of apertures 40, 41, 42 and 43 of which the aperture 40 is most closely positioned to the light emitting element 2. The aperture 43 is the aperture spaced furthest from the light emitting element 2 and is supported immediately adjacent the glass plate 30 which defines one side of the slot 19'. The apertures 40, 41, 42 and 43 increase in area in the direction away from the light emitting element 2. The apertures 40, 41, 42 and 43 are each spaced from the respective adjacent aperture by a spacing a. Alternatively, the spacing between each pair of adjacent apertures can be individually varied in correspondence with the relationship that the spacing increases between each respective pair of apertures in the direction of the aperture 43, or, in other words, the spacing between adjacent apertures increases in the direction of the apertures having larger and larger areas.

The apertures 40, 41, 42 and 43 each comprise a frame. End views of two alternative embodiments of these apertures are illustrated in FIGS. 7 and 8, respectively.

Each aperture 40-43 is formed in a frame which defines a channel. Each frame has an edge 38 and an edge surface 39. The depth of each aperture 40-43 is defined by the edge surface 39 which forms an angle alpha with respect to the lateral extent of the channel such that the edge surface 39 is not contacted by the light beams traveling in the direction in which they are originally emitted from the light emitting element 2. The angle alpha is increasingly more obtuse from aperture to aperture in the direction of the aperture most closely adjacent the slot 19' or, in other words, the inclination of the edge surfaces 39 with respect to the light decreases in the direction away from the light emitting element 2.

Figure 7:
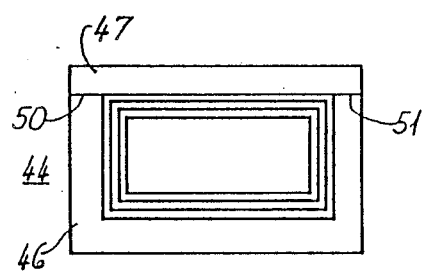
FIG. 7 is an end elevational view of a modified aperture assembly of the apparatus of the present invention.
Figure 8:
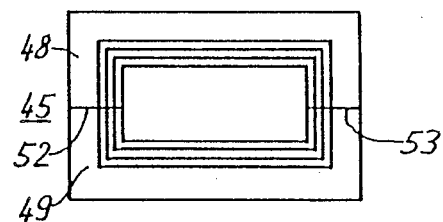
FIG. 8 is an end elevational view of a further modified aperture assembly of the apparatus of the present invention.

In FIG. 7 an aperture assembly 44 securable in the housing 17' is illustrated and includes components 46 and 47. In FIG. 8, an aperture assembly 45 securable in the housing 17' is illustrated and includes components 48 and 49. The respective pair of components of each aperture assembly 44, 45 are adapted to fit together. In FIG. 7, the bottom component 46 is adapted to receive the top component 47 thereon and be secured thereto at the joints 50, 51. Similarly, in the aperture assembly 45 of FIG. 8, the lower component 49 is adapted to receive the upper component 48 thereon and be secured thereto at the joints 52 and 53.

In FIG. 9, a yarn guiding means 5' is illustrated, supported by a bracket in the form of a projection 33' extending from a plate-like cover 17" of housing 17' of the apparatus 18. The projection 33' is formed by stamping of the housing cover 17". A sintered ceramic plate is secured to the end of the bracket 33'.

The light emitting element of the apparatus of the present invention can be a point light source. However, point light sources, such as, for example, light diodes, can be expensive and, in order to use less expensive light sources, one embodiment of the apparatus of the present invention includes an aperture assembly with increasingly larger aperture openings in the direction of the slot. The edges of the light dividing curvature can be modified by the aperture assembly. The contour of the aperture assembly can be adapted to a light passage window or a light sensing element with a right angled light receiving surface. The area of the light passage surfaces of the apertures increases from aperture to aperture in a direction away from the light source. The aperture assemblies of the present invention provide various advantages. For example, an effective division of the light is achieved by such devices so that a lesser priced light source can be successfully used. Additionally, with respect to the manufacturing of the apparatus of the present invention, the assembly and repair of the apparatus is facilitated by the use of such aperture assemblies.

The use of a converging or convex lens disposed between the light source and the slot facilitates the sensing of the yarn traveling through the slot. For example, the converging lens directs the light beam in a parallel orientation through the slot, whereby the significance of the position of the yarn in the slot is less critical with respect to the values obtained.

The sealed chamber in which the light source of the apparatus of the present invention is disposed is preferably blackened or otherwise blocked along its outer surfaces to prevent the penetration of stray light therethrough.

As used herein, the term "light" comprehends the entire spectrum of visible and nonvisible light.

The light receiving surfaces of the light sensing elements can have the same area or can have different areas.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An apparatus for sensing a characteristic of a traveling yarn, comprising:
   a light emitting element;
   a pair of light sensing elements for producing signals in response to sensed light, said pair of light sensing elements being in opposed relation to said light emitting element such that a slot is defined therebetween;
   said light emitting element providing a continuos luminous field within said slot extending across the combined extent of said light sensing elements;
   means for guiding yarn through said continuous luminous field relative to said pair of light sensing elements such that the yarn casts a shadow only on a selected one of said pair of light sensing elements; and
   data processing means, connected to said pair of light sensing elements, for receiving said signals from said light sensing elements, said data processing means developing a control value corresponding with said signal received from said light sensing element which is not shadowed by the yarn, developing a shadow value corresponding to said signal received from said selected one light sensing element and comparing said control value to said shadow value to determine a predetermined characteristic of the yarn.

2. An apparatus according to claim 1 and characterized further in that said light sensing elements are photo electric cells and said signals produced by said light sensing elements are electrical signals corresponding to a predetermined characteristic of the yarn.

3. An apparatus according to claim 1 and characterized further in that said light sensing elements are photo resistors.

4. An apparatus according to claim 2 and characterized further in that said electrical signals correspond to the cross-sectional diameter of the yarn.

5. An apparatus according to claim 2 and characterized further in that said electrical signals correspond to the volume of yarn per unit length.

6. An apparatus according to claim 2 and characterized further in that said electrical signals correspond to the mass of the yarn per unit length.

7. An apparatus according to claims 1 or 2 and characterized further in that said light sensing elements each include a photodiode and an amplifier connected thereto.

8. An apparatus according to claim 1 and characterized further in that said light sensing elements are arranged relative to one another such that they are perpendicular to one another and the lengthwise extent of one of said light sensing elements is perpendicular to the lengthwise extent of the other of said light sensing elements.

9. An apparatus according to claim 8 and characterized further in that said other light sensing element produces a signal of short duration in response to movement of yarn therealong.

10. An apparatus according to claim 1 and characterized further in that said light sensing elements are sealed against dust and other fine particles.

11. An apparatus according to claim 1 and characterized further in that said light emitting element is disposed in a chamber sealed against dust.

12. An apparatus according to claim 1 and characterized further in that said means for guiding yarn includes a pair of yarn guide members, each respectively disposed at opposite spacing from said slot for guiding yarn through said slot.

13. An apparatus for sensing a characteristic of a traveling yarn, comprising:
   a light emitting element;
   a pair of light sensing elements for producing signals in response to sensed light, said pair of light sensing elements being in opposed relation to said light emitting element such that a slot is defined therebetween;
   said light emitting element providing a continuous luminous field within said slot extending across the combined extent of said light sensing elements;
   means for guiding yarn through said continuous luminous field relative to said pair of light sensing elements such that the yarn casts a shadow only on a selected one of said pair of light sensing elements; and
   an aperture assembly positioned between said light emitting element and said slot, said aperture assembly including a plurality of apertures increasing in area in the direction away from said light emitting element.

14. An apparatus according to claim 13 and characterized further in that each of said apertures is formed in a frame with the frames defining a channel formed by said apertures.

15. An apparatus according to claim 14 and characterized further in that said frames have edge surfaces facing said apertures and being inclined with respect to the light from said light emitting element so as not to be directly contacted by the light, and the inclination of the edge surfaces of the frames decreases from frame to frame in the direction away from said light emitting element.

16. An apparatus according to claim 13 and characterized further in that said aperture assembly is an at least partially rigid structure.

17. An apparatus according to claim 16 and characterized further in that said assembly includes a top component and a bottom component, said top and bottom portions being secured together.

18. An apparatus according to claim 13 and characterized further by an optical element for producing parallel light, said optical element being positioned between said slot and said light emitting element.

19. An apparatus according to claim 13 and characterized further in that said light emitting element and said aperture assembly are disposed in a chamber sealed against dust.

20. An apparatus for sensing a characteristic of a traveling yarn, comprising:
   a housing having a slot;
   a light emitting element positioned on one side of said slot;
   light sensing means positioned in opposed relation to said light emitting element on another side of said slot, said light sensing means producing signals in response to sensed light;
   said light emitting element providing a continuous luminous field within said slot extending across said light sensing means;
   means for guiding yarn through said continuous luminous field relative to said light sensing means such that the yarn casts a shadow on said light sensing means; and
   an aperture assembly positioned between said light emitting element and said slot, said aperture assembly including a plurality of apertures increasing in area in the direction away from said light emitting element.

21. An apparatus according to claim 20 and characterized further in that each of said apertures is formed in a frame with the frames defining a channel formed by said apertures.

22. An apparatus according to claim 21 and characterized further in that said frames have edge surfaces facing said apertures and being inclined with respect to the light from said light emitting element so as not to be directly contacted by the light, and the inclination of the edge surfaces of the frames decreases from frame to frame in the direction away from said light emitting element.

23. An apparatus according to claims 20, 21 or 22 and characterized further in that said aperture assembly is an at least partially rigid structure.

24. An apparatus according to claim 23 and characterized further in that said assembly includes a top component and a bottom component, said top and bottom portions being secured together.

25. An apparatus according to claim 20 and characterized further by an optical element for producing parallel light, said optical element being positioned between said slot and said light emitting element.

26. An apparatus according to claim 20 and characterized further by a data processing means, connected to said light sensing means, for receiving said signals from said light sensing means, said data processing means developing a control value corresponding to a signal received from said light sensing means representing the intensity of the light emitted by said light emitting element, developing a shadow value corresponding to a signal received from said light sensing means representing the intensity of the light emitted by said light emitting element as shadowed by the traveling yarn and comparing said control value to said shadow value to determine a predetermined characteristic of the yarn.

* * * * *